July 1, 1958   C. A. VAN PAPPELENDAM   2,841,689
TUBULAR SPRING WELDING ELECTRODE Filed June 5, 1956   2 Sheets-Sheet 1

*INVENTOR.*
CARL A. VAN PAPPELENDAM
BY *William R. Lane*
ATTORNEY

July 1, 1958

C. A. VAN PAPPELENDAM 2,841,689

TUBULAR SPRING WELDING ELECTRODE

Filed June 5, 1956

INVENTOR.
CARL A. VAN PAPPELENDAM
BY
*William R Lane*
ATTORNEY

United States Patent Office 2,841,689
Patented July 1, 1958

2,841,689

TUBULAR SPRING WELDING ELECTRODE

Carl A. van Pappelendam, Rivera, Calif., assignor to North American Aviation, Inc.

Application June 5, 1956, Serial No. 589,493

13 Claims. (Cl. 219—78)

This invention relates to a tubular spring type electrode, and more particularly to an internal electrode for use in a multiple row welding process employed in the fabrication of metal sandwich construction.

The electrode described herein is usable in the apparatus described in applicant's U. S. Patent No. 2,747,064, for "Apparatus for Making Corrugated Core Structural Sheet Metal."

In the development of a machine for fabrication of metal sandwiches having corrugated cores, considerable problems have occurred in regard to the internal electrode which makes welding contact on an inside surface of the corrugated core. In order to obtain good welds in the multiple welding of the core to the facing sheets of the sandwich, the tip load from electrode to electrode must be uniform. In other words, the pressures exerted by the individual tips on the core surfaces must all be the same.

Further, the tips must all make contact with the core at points on a line and in line with common tangent points on the external roller electrode which makes welding contact on the facing sheet to which the core is welded.

The welding electrode contemplated in this invention is comprised generally of a spring tube means which is connected on one end to a support beam, a cooling water source and a welding transformer, and at the other end to a welding tip. These electrodes are used in applicant's apparatus, referred to above, in which hundreds of welds in a row are made simultaneously.

For the multiple welding operation the upper electrodes in the present invention are directed downward to weld the lower apexes of the core to the lower facing sheet, and the lower electrodes are spaced between the upper electrodes and are directed upward to weld the upper apexes of the core to the upper facing sheet.

The present electrodes, as used in multiple welding, have a number of advantages. For example, they have a uniform tip load from electrode to electrode as each assembled electrode can be precisely calibrated for load. The electrodes may be calibrated by machining the mounting surfaces to correctly locate the welding tip when the predetermined load is applied. The uniform tip load is made possible in part by the elimination of friction variables, such as pivots or sliding bearings. In addition, there is no possible variation in load due to flexing of laminated or woven electrical conductors, and there are no hydraulic or air pistons and linkages which could produce varying friction.

In the multiple electrodes of the present invention, there is more uniform electrical resistance from electrode to electrode. This is made possible by having no electrical conducting bearings and having no mechanically made electric connections within the electrode, all connections being soldered. Further, all the electrical conductors are water cooled to provide more constant temperature and more constant electrical resistance. There is also a reduction of the tip cooling variables in that the cooling nozzles are an integral part of each electrode and are located adjacent to the tips to provide direct cooling. This direct cooling makes for long tip life.

The present invention provides a more positive tip location in contrast to electrodes pivoted on segment bearings which can move slightly downstream under certain conditions to change both the tip load and the electrical resistance. In addition, each electrode can be on a separate electrical circuit to provide precise and individual control of electrical conditions. This is made possible by insulating the electrodes from the supporting structure. Any number of electrodes can be mounted on a single support beam, and the size of this beam can be made as large as necessary to span any width of sandwich material desired. The entire upper, or lower, bank of electrodes can be removed along with the support beam as a single unit. Moreover, the electrodes are arranged on the support beam so that electrodes can be removed individually and welding tips can be replaced without removing individual electrodes from the support beam. The required tip load for welding is transferred through the spring tubes, thus eliminating the need for an air or a hydraulic pressure system.

The electrodes provided in the present invention also are very proficient in the welding of thin sheets where a number of welds are required to be made simultaneously in a row, or even where welds are made singly. In this type of operation, the spring electrodes are of considerable advantage because they can be precisely calibrated so that a definite and constant load can be applied to the thin material. This eliminates the dangers of overloading and damaging the sheets, or of underloading and making a poor weld. The latter problems are ever present with an air or a hydraulic pressure system.

It is therefore an object of this invention to provide an improved welding electrode.

It is a principal object of this invention to provide an improved electrode for the multiple row welding process used in assembling metal sandwiches.

It is a further object of this invention to provide multiple electrodes to make many simultaneous welds in different rows with little or no variation in the weld strengths.

It is a still further object of this invention to provide welding electrodes which can be precisely calibrated for load and in which friction variables are eliminated.

It is an object of this invention to provide positive tip location for all the electrodes in the multiple electrode process.

It is a further object of this invention to provide multiple electrodes in which there is precise and individual control of electrical conditions for each electrode.

It is a still further object of this invention to provide longer electrode tip life by proper cooling.

It is another object of this invention to provide a bank of electrodes which can be removed as a single unit, or from which individual electrodes can be removed without affecting the others, and from which welding tips can be replaced without removing the individual electrodes.

It is still another object of this invention to provide a welding electrode in which the required tip load for welding is produced entirely through spring tubes, thus eliminating the need for an air or hydraulic pressure system.

It is a further object of this invention to provide a welding electrode in which spring tubes transfer load, electricity and cooling water to the welding tip.

Other objects of invention will become apparent from the following description taken in connection with the accompanying drawings, in which Fig. 1 is an elevational view of the multiple welding electrodes and their support structure for fabricating metal sandwiches;

Figure 3:
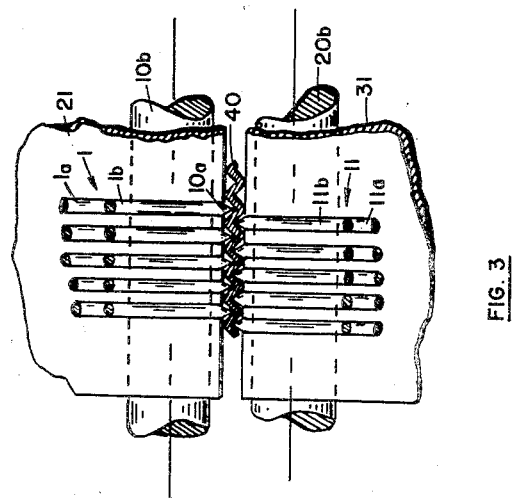
Fig. 3 is a view taken along the line 3—3 of Fig. 2.
Figure 1:
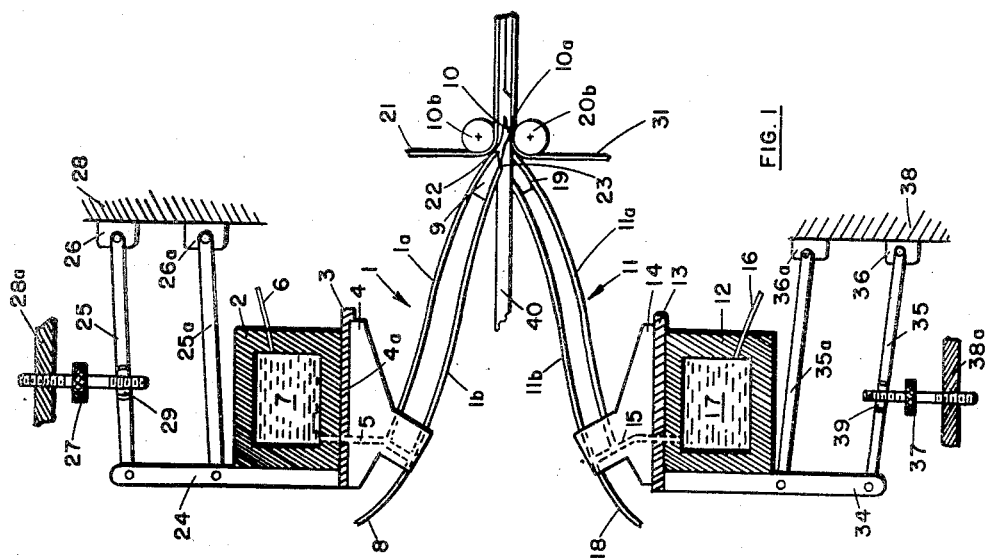
Figure 2:
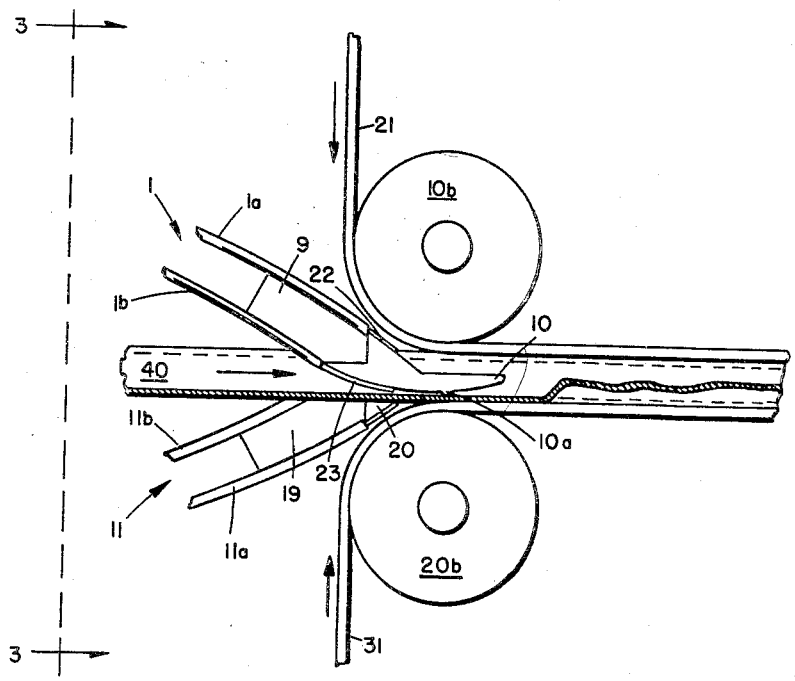
Fig. 2 is an enlarged cutaway view of the welding tips as shown in Fig. 1.

Referring to Figs. 1–3, rows of multiple electrodes are shown in position to weld a corrugated core to facing sheets to make a metal sandwich. An electrode base 4 of each of the electrodes 1 is secured to upper support beam 2 with electrical insulator 3 spaced therebetween. Substantially parallel spring tubes 1a and 1b in each electrode are soldered at one end in each individual base 4 and at the other end are soldered to an individual welding frame 9. Also soldered to frame 9 is welding tip 10 which has a point 10a which makes welding contact along the lower apexes of the V's of the corrugated core. The above connections are soldered to provide more uniform current conduction between the members; however, they may be otherwise attached, such as with screws or clamps.

Support beam 2 is held vertically by upper vertical support arm 24, connected to upper parallel pivot arms 25 and 25a which in turn are connected to pivots 26 and 26a on stationary frame 28. This parallel linkage is desirable to retain parallel relationship between the beam and welding surfaces. Upper adjusting bolt 27 is threadedly engaged in trunnion 29 in pivot arm 25 and in stationary frame 28a so that rotation of bolt 27 in one direction will raise support beam 2 and tend to relieve the bending load on tubes 1a and 1b. Rotation in the other direction will tend to depress tubes 1a and 1b and apply additional load on welding tip 10 and point 10a against core 40. Tubes 1a and 1b are shown in a depressed state, similar to actual operational conditions, when the predetermined load is transferred from the support beam through the tubes to the welding surface. When beam 2 is raised so that no load is applied, tubes 1a and 1b are substantially straight and parallel. The upper straight surface 4a of base 4 against insulator 3 is substantially parallel to the welding surfaces on the core and remains so at all times. A longitudinal axis through welding tip 10, parallel to the welding surfaces, is always in the same position irrespective of the spring bending of tubes 1a and 1b. This is made possible by securing tube 1a and 1b in the proper positions in base 4 and by having them of the proper length relative to the point where the welds are made. The parallel linkage prevents any tilting of welding tip 10 and thereby prevents it from making any contacts with core 40 other than on the lower apex of the V in which it is inserted.

Spring tubes 1a and 1b may be made of heat treated berylium-copper or other materials, such as spring steel. The former is preferred because of its better electrical conductive ability. They transfer load, electrical current, and cooling water to welding tip 10. A cooling fluid, such as water, is supplied to passage 7 in beam 2 by supply tube 6. Water passage 5 extends from passage 7 to each individual electrode base 4 and thence, into one end of tubes 1a and 1b. At their other ends are water discharge nozzles 22 and 23, respectively. Nozzle 22 supplies water to the upper portion of tip 10 and nozzle 23 supplies water directly onto point 10a. Constant cooling is generally required in the tip area because of the heat developed in the resistance welding operation. A tube 8, connected to each base 4, is open to water passage 5 and is connected to a welding transformer so as to feed current to each conducting base 4 and tubes 1a and 1b. Tubes 8 also serve to supply cooling water to a manifold, not shown, which is provided for the multiple electrical connections to the transformer, and which is heated by the flow of current therethrough. The water is drained from this manifold and from the welding tips to a recirculating tank.

The lower row of multiple electrodes 11 are secured side by side in the same manner as the upper electrodes except that they are upside down and are placed to weld in the upper apexes of the inverted V's of the core, i. e., the tips of the upper and lower electrodes are arranged between each other and are directed in the opposite direction. Lower support beam 12 is secured to individual electrode bases 14 with electrical insulator 13 therebetween. Tubes 11a and 11b are soldered to electrode bases 14 to connect to water passages 15 and passage 17 in beam 12, which is in turn connected to water supply tube 16. Tubes 11a and 11b are soldered at their other ends to individual welding frames 19 and terminate in water nozzles, such as 22 and 23. A welding tip 20, like tip 10, is secured to each welding frame 19. Tube 18 is connected to a welding transformer to feed electrical current to the electrode and supplies cooling water to an electrical manifold, not shown, to which all the tubes 18 are connected for the individual electrodes.

Lower vertical support arm 34 is connected to support beam 12 and to lower pivot arms 35 and 35a. Arms 35 and 35a are connected to pivots 36 and 36a on stationary frame 38. Adjusting bolt 37 is threadedly engaged in stationary frame 38a and trunnion 39 in pivot arm 35. Rotation of bolt 37 raises or lowers support beam 12.

Upper sandwich sheet 21 is fed to contact the upper surface of core 40 under roller electrode 10b, continuous resistance welds being made through the points, typically tungsten, on tips 20 and electrode 10b to weld upper sheet 21 to the upper apexes of core 40. In the same manner, lower sandwich sheet 31 is fed around lower roller electrode 20b to contact the lower surface of core 40 and continuous welds are made through tungsten points 10a and electrod 20b to weld the lower facing sheet 31 to the lower apexes of the V-shaped corrugations of the core.

Fig. 2 is an enlarged view of a portion of Fig. 1 to better illustrate the electrode tips and surrounding configurations. The first V of core 40 is partially cut away to show point 10a in contact with the bottom surface of the V. Core 40 and sheets 21 and 31 are in constant movement during the welding process in the direction indicated by the arrows. In Fig. 3, showing a view taken along the line 3—3 of Fig. 2, the welding tips of electrodes 1 and 11 are shown in actual contact with the lower and the upper apexes of the core.

Figure 4:
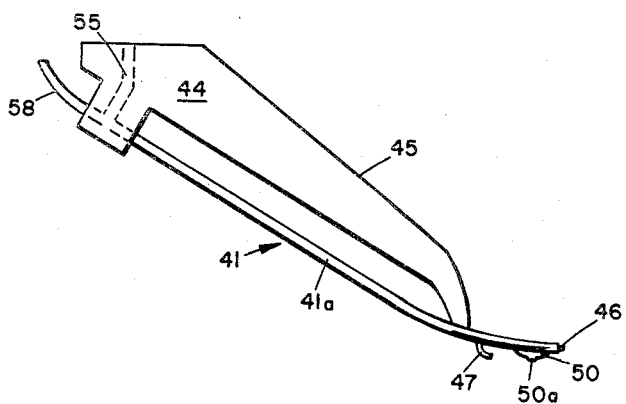
Fig. 4 is an elevational view of the present invention having only one spring tube.

In Fig. 4 is shown an embodiment of the invention using only one spring tube electrode 41, having its base 44 for connection to support beams 2 and 12 in the same manner as electrode bases 4 and 14. Extending from base 44 is arm 45 which supports tube 41a at its contact therewith. One end of water passage 55 is connected to the water cavity in the support beam and its other end is connected to electrical connection tube 58 and tube 41a. Tube 58 supplies cooling water to the electrical manifold connection, not shown, and tube 41a supplies cooling water to the welding tip 50 through nozzles 46 and 47. Nozzle 47 is directed to spray water directly on point 50a to provide long tip life. This embodiment eliminates welding frames 9 or 19 but does not provide the parallel linkage achieved with the use of 2 tubes. It is desirable for use where the amount of load adjustment required is not great enough, relative to the calibrated load, to cause the end of the tube to be bent upward and possibly contact the upper sheet metal facing of the sandwich. Other more general applications of either the multiple or single tube electrode of this invention are readily apparent.

The present invention, thus, provides a new internal electrode which by means of spring tubes transfers pressure, electrical current and cooling water to the electrode tip and the welding surface. These individual electrodes are calibrated precisely for the exact load required to be applied to the welding surface in order to achieve satisfactory welds, and no individual adjustment is required. Because of the resilience of the spring tubes, they can be moved apart laterally so that when it is desired to replace a welding tip, heat can be applied with a small torch which will melt the solder and allow the removal of the tip. The new tip is then inserted in the same manner and the solder is allowed to solidify.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A welding electrode comprising an electrode, means to support said electrode, an electrode base secured to said support means, a welding tip, resilient means connecting said electrode base with said welding tip to carry current and cooling fluid to said welding tip and means on said support means to hold said resilient means at a predetermined tension.

2. A welding electrode comprising a welding tip, an electrode base, and spring means connecting said base with said welding tip, said spring means adapted to carry current and cooling fluid to said welding tip.

3. A welding electrode for making contact on one of two surfaces to be welded together comprising a tubular spring member of electrically conductive material, and means to conduct a cooling liquid within said member to a welding tip thereon.

4. A welding electrode according to claim 3 including a means connected to said member to adjust the tension of said member to predetermine the contact pressure of said tip on said one surface.

5. A welding electrode assembly comprising a support; at least one hollow, electrically conductive spring tube extending from said support, an electrode tip portion on one end of said tube.

6. A welding electrode according to claim 5 including means to adjust the spring tension in said tube to vary contact pressures in said tip.

7. A welding electrode for making contact on one of two surfaces to be welded together comprising a support beam, an electrode base secured to and insulated from said beam, a welding tip, a spring tube connecting said base and said welding tip, and a support arm extending from said base to said tube adjacent said tip, said tube connected at one end to said beam through said base and at the other end to said welding tip to supply cooling water from said beam to said welding tip and to apply pressure from said beam through said welding tip to said one surface to be welded, said tube connected to a welding transformer to feed current to said welding tip.

8. A welding electrode for making contact on one of two surfaces to be welded together comprising a support beam, an electrode base secured to and insulated from said beam, a welding frame, first and second spring tubes connecting said electrode base to said welding frame, and a welding tip secured to said frame, said tubes connected at one end to said beam through said base and at the other end to said welding frame to supply cooling water from said beam to said welding tip and to apply pressure from said beam through said welding tip to said one surface to be welded, one of said tubes connected to a welding transformer to feed current to said welding tip.

9. A welding electrode according to claim 8 in which said spring tubes are substantially parallel.

10. A welding electrode according to claim 9 in which said beam is moveable in a vertical plane to vary the pressure on said one surface by said tip and in which the longitudinal axis of said welding tip is the same for any pressure applied to said one surface by said beam through said tip.

11. A welding electrode for making contact on one of two surfaces to be welded together comprising a support beam having a cooling water passage therein, an electrode base secured to said beam and having an electrical insulator secured therebetween, a welding frame, first and second substantially parallel spring tubes connecting said electrode base to said welding frame, a welding tip on said welding frame, said tubes connected at one end to said beam through said base and said insulator and at the other end to said welding frame to supply cooling water from said beam to said welding tip and to apply pressure from said beam through said tip to said one surface to be welded, said beam being moveable in a vertical plane to vary the pressure on said one surface from said tip, a discharge nozzle on said other end of said first tube fixed to spray water onto the upper side of said tip, and a discharge nozzle on said other end of said second tube fixed to spray water onto the lower side of said tip, said second tube connected to a welding transformer to feed current to said welding tip, the longitudinal axis of said welding tip being the same for any pressure applied to said one surface from said beam through said tip.

12. A welding electrode for making welding contact on one of two surfaces to be welded together comprising a support beam, an electrode base secured to said beam, an electrical insulator secured between said base and said beam, a welding tip, a spring tube connecting said base and said welding tip, a support arm extending from said base to said tube adjacent said tip, said tube connected at one end to said beam through said base and said insulator and at the other end to said welding tip to supply cooling water from said beam to said welding tip and to apply pressure from said beam through said welding tip to said one surface to be welded, said beam being moveable in a vertical plane to vary the pressure on said one surface from said tip, a first discharge nozzle extending from said other end of said tube fixed to spray water adjacent to said tip, and a second discharge nozzle extending from said tube directed to spray water onto the lower side of said tip, said tube connected to a welding transformer to feed current to said welding tip.

13. In combination, a plurality of welding electrodes in juxtaposition for making welding contacts on one of two surfaces to be welded together comprising a support beam having a water passage therein, each electrode having a base portion secured to and insulated from said beam; each of said electrodes further comprising a welding frame, first and second substantially parallel spring tubes connecting said electrode base to said welding frame, a welding tip on said welding frame, said tubes connected at one end to said beam through said base and at the other end to said welding frame to supply cooling water from said beam to said welding tip and to apply pressure from said beam through said tip to said one surface to be welded, said beam being moveable in a vertical plane to vary the pressure on said one surface from said tip, a discharge nozzle on said other end of said first tube fixed to spray water on the upper side of said tip, and a discharge nozzle on said other end of said second tube fixed to spray water onto the lower side of said tip, said second tube connected to a welding transformer to feed current to said welding tip, the longitudinal axis of said welding tip being the same for any pressure applied to said one surface from said beam through said tip.

References Cited in the file of this patent

UNITED STATES PATENTS

| | | |
|---|---|---|
| 2,249,937 | Bohn | July 22, 1941 |
| 2,383,383 | Harding | Aug. 21, 1945 |